United States Patent
Taguchi et al.

(10) Patent No.: US 12,179,153 B2
(45) Date of Patent: *Dec. 31, 2024

(54) HOLLOW FIBER MEMBRANE MODULE

(71) Applicant: NITTO DENKO CORPORATION, Ibaraki (JP)

(72) Inventors: Masamitsu Taguchi, Osaka (JP); Hiroki Fujioka, Osaka (JP); Toshiaki Suga, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 382 days.

This patent is subject to a terminal disclaimer.

(21) Appl. No.: 17/639,204

(22) PCT Filed: Jul. 28, 2020

(86) PCT No.: PCT/JP2020/028875
§ 371 (c)(1),
(2) Date: Feb. 28, 2022

(87) PCT Pub. No.: WO2021/059729
PCT Pub. Date: Apr. 1, 2021

(65) Prior Publication Data
US 2022/0323907 A1    Oct. 13, 2022

(30) Foreign Application Priority Data
Sep. 25, 2019  (JP) .................... 2019-173935

(51) Int. Cl.
*B01D 63/04* (2006.01)
*B01D 63/02* (2006.01)
(Continued)

(52) U.S. Cl.
CPC ......... *B01D 63/043* (2013.01); *B01D 63/024* (2013.01); *B01D 63/031* (2022.08);
(Continued)

(58) Field of Classification Search
None
See application file for complete search history.

(56) References Cited

U.S. PATENT DOCUMENTS

| 3,554,379 A | 1/1971 | Pye |
| 4,414,110 A | 11/1983 | Geel et al. |

(Continued)

FOREIGN PATENT DOCUMENTS

| EP | 1034834 A2 | 9/2000 |
| EP | 1034834 A3 | 9/2000 |

(Continued)

OTHER PUBLICATIONS

International Search Report and Written Opinion issued for International Patent Application No. PCT/JP2020/028875, Date of mailing: Oct. 13, 2020, 17 pages including English translation.

(Continued)

*Primary Examiner* — Krishnan S Menon
(74) *Attorney, Agent, or Firm* — HSML P.C.

(57) ABSTRACT

A hollow fiber membrane module (100) of the present invention includes: a plurality of hollow fiber membranes (10); a binding portion (20) binding the plurality of hollow fiber membranes (10) at one end portions thereof; and a cap (30) having an internal space (30s) that communicates with each of the plurality of hollow fiber membranes (10), the cap (30) being integrated with the binding portion (20); and a housing (40) that houses the plurality of hollow fiber membranes (10) and the binding portion (20), and that has one end portion to which the cap (30) is attached. A unit (70) including the plurality of hollow fiber membranes (10), the binding portion (20), and the cap (30) is detached from the housing (40) and the unit (70) is attached to the housing (40) while integration of the binding portion (20) and the cap (30) is maintained.

12 Claims, 5 Drawing Sheets

(51) Int. Cl.
  *B01D 65/00* (2006.01)
  *C02F 1/44* (2023.01)
  *C02F 103/04* (2006.01)

(52) U.S. Cl.
  CPC .............. *B01D 65/003* (2013.01); *C02F 1/44* (2013.01); *C02F 2103/04* (2013.01)

(56) References Cited

U.S. PATENT DOCUMENTS

| | | | |
|---|---|---|---|
| 5,236,586 | A | 8/1993 | Antoni et al. |
| 11,565,216 | B2 * | 1/2023 | Yamane .............. B01D 63/022 |
| 2012/0097601 | A1 | 4/2012 | Lee et al. |
| 2015/0165382 | A1 | 6/2015 | Lee et al. |
| 2015/0359958 | A1 | 12/2015 | Kaestner |
| 2017/0050148 | A1 | 2/2017 | Taniguchi |
| 2019/0105608 | A1 | 4/2019 | Asatsuma et al. |
| 2019/0168135 | A1 | 6/2019 | Tanizaki et al. |
| 2021/0039047 | A1 | 2/2021 | Yamane et al. |
| 2024/0001311 | A1 * | 1/2024 | Rearden .............. B01F 25/3141 |

FOREIGN PATENT DOCUMENTS

| | | |
|---|---|---|
| EP | 2722098 | 4/2014 |
| JP | S5015790 | 2/1975 |
| JP | S5016165 | 2/1975 |
| JP | S61234905 | 10/1986 |
| JP | H0183402 U | 6/1989 |
| JP | H06205945 | 7/1994 |
| JP | H07308549 A | 11/1995 |
| JP | 2004154725 | 6/2004 |
| JP | 2015522417 | 8/2015 |
| JP | 2017039122 | 2/2017 |
| JP | 6615969 B1 | 12/2019 |
| TW | 201735989 A | 10/2017 |
| WO | 2005063366 A2 | 7/2005 |
| WO | 2005063366 A3 | 12/2005 |
| WO | 2014017818 | 1/2014 |

OTHER PUBLICATIONS

International Search Report and Written Opinion issued for International Patent Application No. PCT/JP2019/037676, Date of mailing: Nov. 19, 2019, 9 pages including English translation of Search Report.

Extended European Search Report issued for European Patent Application No. 19865094.7, dated Jun. 22, 2021, 9 pages.

Notice of Reasons for Refusal issued for Japanese Patent Application No. 2019-173935, Dispatch Date: Jan. 31, 2023, 22 pages including English machine translation.

U.S. Appl. No. 16/969,115, filed Aug. 11, 2020.

Office Action issued for Taiwanese Patent Application No. 109127063, dated Mar. 12, 2024, 15 pages including English translation.

Rejection Decision issued for Taiwanese Patent Application No. 109127063, dated Jul. 29, 2024, 6 pages including English translation.

* cited by examiner

HOLLOW FIBER MEMBRANE MODULE

TECHNICAL FIELD

The present invention relates to a hollow fiber membrane module.

BACKGROUND ART

For example, for manufacturing semiconductors, a large amount of ultrapure water is indispensable. Ultrapure water is produced in a system having a hollow fiber membrane module. The hollow fiber membrane module is used in various fields, e.g., for waste water treatment, food production, and the medical field as well as production of ultrapure water.

The hollow fiber membrane module disclosed in Patent Literature 1 includes a bundle of hollow fiber membranes, a housing, a cap, and a potting material. An O-ring is disposed between the cap and the potting material. The potting material is fixed to the housing by an adhesive.

CITATION LIST

Patent Literature

Patent Literature 1: JP2017-39122A

SUMMARY OF INVENTION

Technical Problem

In the above-described structure, liquid tends to be accumulated in a groove for the O-ring, and a contamination such as particulates may be accumulated in the groove. Cleaning liquid does not easily flow in the groove for the O-ring, and the hollow fiber membrane module is not easily cleaned without disassembling the module. The accumulation of a contamination may negatively affect various processes using permeate liquid, for example, a process of cleaning a semiconductor substrate.

Patent Literature 1 suggests a structure for narrowing a region in which fluid is accumulated. However, there is still room for improvement.

Furthermore, since the potting material is fixed to the housing by the adhesive, the bundle of hollow fiber membranes cannot be taken out from the housing without breaking the hollow fiber membrane module.

An object of the present invention is to provide a hollow fiber membrane module in which a contamination such as particulates is hardly accumulated and components such as hollow fiber membranes can be easily cleaned, changed, or repaired.

Solution to Problem

The present invention is directed to a hollow fiber membrane module that includes:

a plurality of hollow fiber membranes;

a binding portion binding the plurality of hollow fiber membranes at one end portions thereof; and a cap having an internal space that communicates with each of the plurality of hollow fiber membranes, the cap being integrated with the binding portion; and a housing that houses the plurality of hollow fiber membranes and the binding portion, and that has one end portion to which the cap is attached, wherein a unit including the plurality of hollow fiber membranes, the binding portion, and the cap is detached from the housing and the unit is attached to the housing while integration of the binding portion and the cap is maintained.

Advantageous Effects of Invention

The present invention provides the hollow fiber membrane module in which a contamination such as particulates is hardly accumulated and the components such as the hollow fiber membranes can be easily cleaned, changed, or repaired.

DESCRIPTION OF EMBODIMENTS

An embodiment of the present invention will be described below with reference to the drawings. The present invention is not limited to the embodiments described below.

Figure 1:
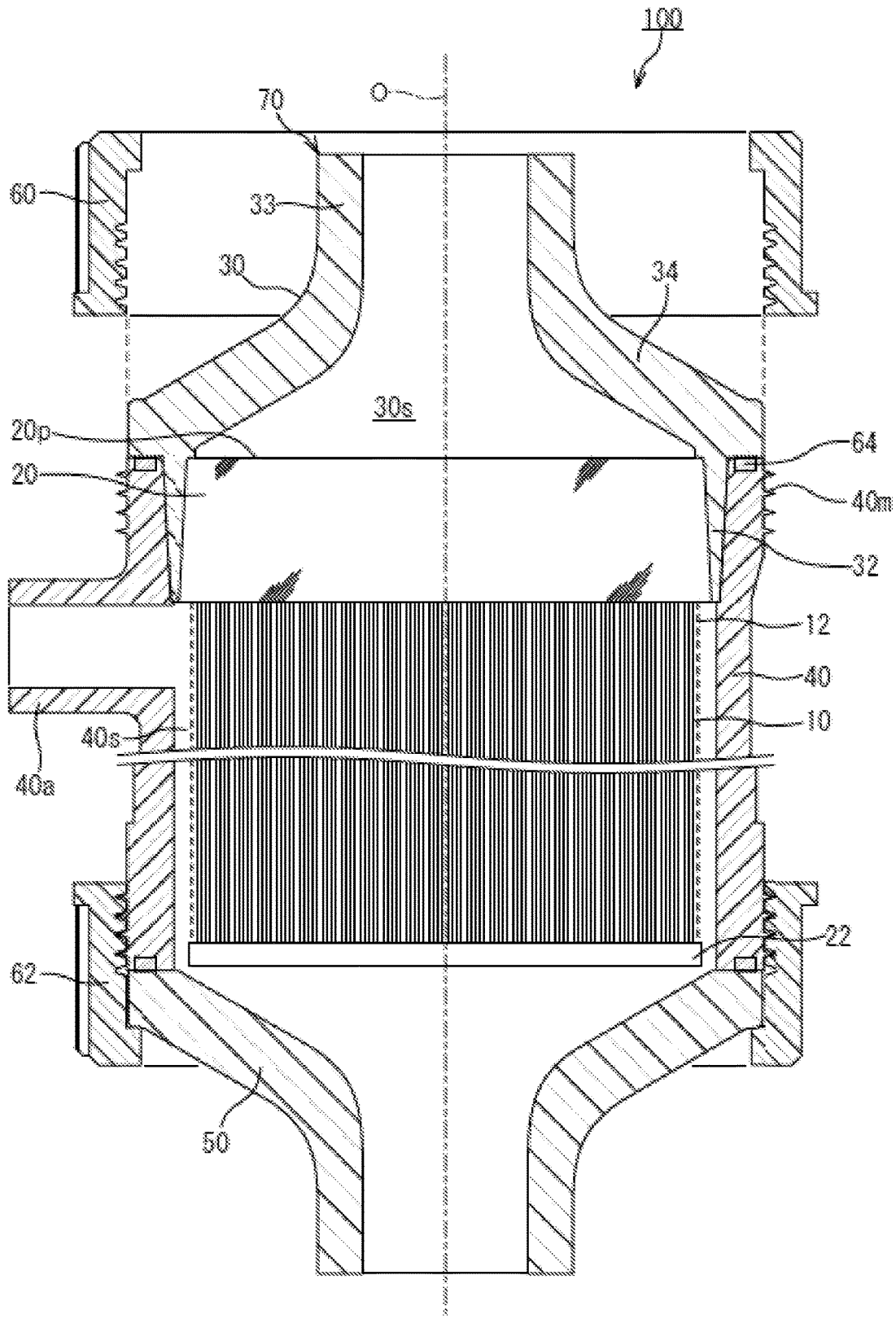
FIG. 1 is a perspective cross-sectional view of a hollow fiber membrane module according to one embodiment of the present invention.
Figure 2:
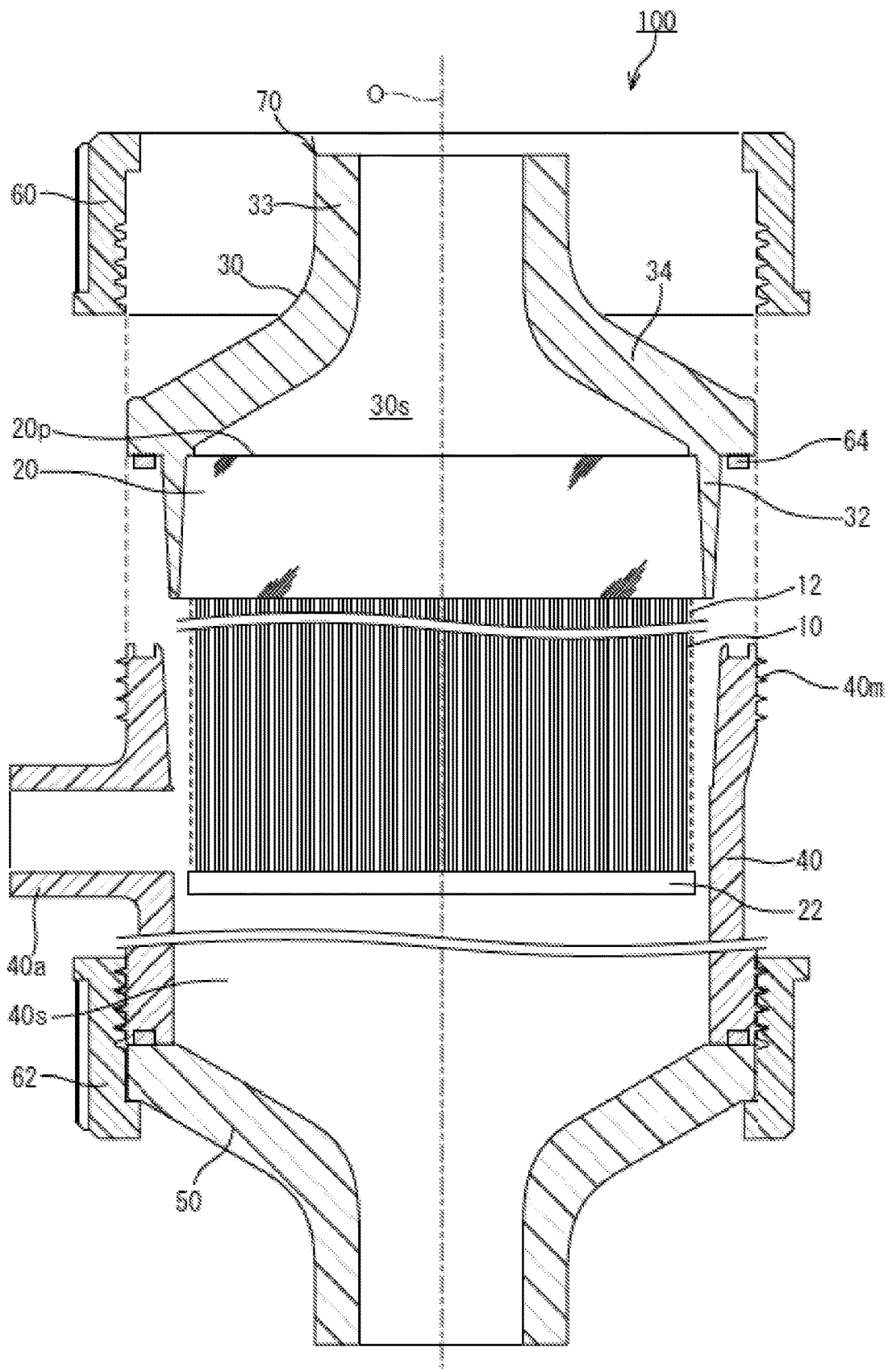
FIG. 2 is a cross-sectional view of the hollow fiber membrane module shown in FIG. 1.
Figure 3:
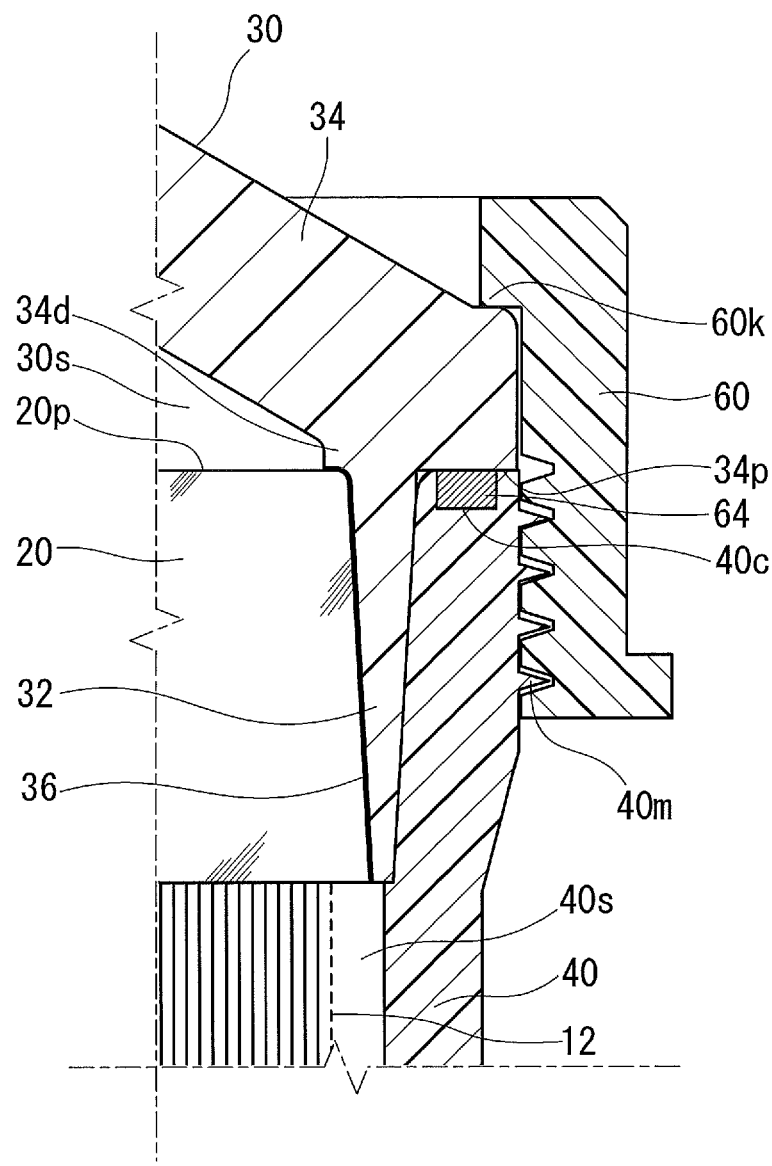
FIG. 3 is a partially enlarged view of FIG. 2.

FIG. 1 is a perspective cross-sectional view of a hollow fiber membrane module according to one embodiment of the present invention. FIG. 2 illustrates a partially enlarged cross-section of the hollow fiber membrane module shown in FIG. 1. FIG. 3 is a partially enlarged view of FIG. 2.

As shown in FIG. 1 and FIG. 2, a hollow fiber membrane module 100 of the present embodiment includes a plurality of hollow fiber membranes 10, a binding portion 20, a cap 30, and a housing 40. The plurality of hollow fiber membranes 10 are bound at one end portions thereof by the binding portion 20. The plurality of hollow fiber membranes 10 are sealed at the other end portions thereof by a sealing portion 22. The hollow fiber membranes 10 and the binding portion 20 are housed in the housing 40. The cap 30 is integrated with the binding portion 20, and attached to one end portion of the housing 40. A unit 70 is formed by the hollow fiber membranes 10, the binding portion 20, and the cap 30. The unit 70 can be detached from the housing 40 in a non-destructive manner. That is, the unit 70 can be detached from the housing 40 and the unit 70 can be attached to the housing 40 while integration of the binding portion 20 and the cap 30 is maintained.

In the description herein, the "integration" represents a state where separation of components in a non-destructive manner cannot be performed. The "non-destructive manner" represents a state where separation and integration are reversible. For example, separation of components fixed to each other by an adhesive is not included in the concept of being the non-destructive manner.

The hollow fiber membrane module 100 is, for example, an external-pressure-type hollow fiber membrane module. In the hollow fiber membrane module 100, raw liquid flows outside the hollow fiber membranes 10, and permeate liquid flows in the hollow fiber membranes 10. The raw liquid is, for example, water to be treated. The permeate liquid is, for example, pure water or ultrapure water.

The plurality of hollow fiber membranes 10 are aligned parallel to each other, and are bound by the binding portion 20. Examples of the hollow fiber membranes 10 include microfiltration membranes, ultrafiltration membranes, and reverse osmosis membranes. The number, dimensions, and material of the hollow fiber membranes 10 are not particularly limited. The number of the hollow fiber membranes 10 is, for example, 1000 to 20000. The outer diameter of the hollow fiber membrane 10 is, for example, 0.2 to 2.0 mm. The length of the hollow fiber membrane 10 is, for example, 800 to 1200 mm. Examples of the material of the hollow fiber membrane 10 include polysulfone, polyether sulfone, poly(vinylidene fluoride), polyacrylonitrile, a poly(vinyl chloride)-polyacrylonitrile copolymer, polyimide, and cellulose acetate.

The binding portion 20 is a portion that binds the plurality of hollow fiber membranes 10 at one end portions thereof. The binding portion 20 has, for example, a columnar shape or truncated-cone shape. The binding portion 20 is formed by, for example, potting. In this case, the binding portion 20 is also called a potting portion. The binding portion 20 can be formed of resin that is filled between the hollow fiber membrane 10 and the hollow fiber membrane 10. Examples of the resin that forms the binding portion 20 include epoxies and urethanes.

The binding portion 20 partitions the flow path of the raw liquid and the flow path of the permeate liquid. The flow path of the raw liquid is, for example, an internal space 40s of the housing 40. The flow path of the permeate liquid is, for example, an internal space 30s of the cap 30. The internal space 40s of the housing 40 is isolated from the internal space 30s of the cap 30 by the binding portion 20.

The cap 30 is a funnel-shaped component which is integrated with the binding portion 20. The cap 30 has the internal space 30s that communicates with each of the plurality of hollow fiber membranes 10. Each of the plurality of hollow fiber membranes 10 extends up to an end surface 20p of the binding portion 20, and is opened at the end surface 20p of the binding portion 20 toward the internal space 30s of the cap 30. The permeate liquid is delivered from the hollow fiber membranes 10 through the internal space 30s of the cap 30 to the outside of the hollow fiber membrane module 100. A component such as piping and a connector can be connected to an end portion 33 of the cap 30. The end portion 33 has, for example, a tubular shape. In the present embodiment, the cap 30 is integrated with the binding portion 20 by an adhesive.

The material of the cap 30 is not particularly limited. The cap 30 may be formed of resin such as vinyl chloride, polycarbonate, and polysulfone.

The housing 40 is a cylindrical component in which the plurality of hollow fiber membranes 10 and the binding portion 20 are housed. The housing 40 is opened at both end portions thereof. The cap 30 is attached to the one end portion of the housing 40. The housing 40 has a nozzle-like outlet 40a for discharging liquid from the internal space 40s. The outlet 40a projects in the direction perpendicular to the longitudinal direction of the housing 40, and communicates with the internal space 40s of the housing 40.

The longitudinal direction of the housing 40 is parallel to the longitudinal direction of the hollow fiber membrane 10. A central axis O of the housing 40 extends parallel to the longitudinal direction of the housing 40 through the center of the housing 40.

The material of the housing 40 is not particularly limited. The housing 40 may be formed of resin such as vinyl chloride, polycarbonate, and polysulfone. The material of the cap 30 may be the same as the material of the housing 40.

The hollow fiber membrane module 100 further includes a fastening member for fixing the cap 30 and the housing 40 to each other. When the cap 30 and the housing 40 fixed by the fastening member are unfixed, the unit 70 can be detached from the housing 40. The fastening member is a mechanical means that allows the unit 70 to be attached to the housing 40 and allows the unit 70 to be detached from the housing 40.

The hollow fiber membrane module 100 has a nut 60 as the fastening member. The housing 40 has a screw portion 40m on the outer circumferential surface of the one end portion thereof, and the nut 60 is screwed onto the screw portion 40m in a state where the housing 40 is covered with the cap 30. The material of the nut 60 is not particularly limited. The nut 60 may be formed of resin or metal.

The hollow fiber membrane module 100 further includes a cap 50 and a nut 62. The cap 50 is a funnel-shaped component that is attached to the other end portion of the housing 40. The nut 62 is an example of a fastening member for fixing the cap 50 and the housing 40 to each other. The nut 62 is screwed onto a screw portion (not shown) provided on the outer circumferential surface of the other end portion of the housing 40. Thus, the cap 50 is fixed to the housing 40. Raw liquid is guided through the cap 50 from the outside of the hollow fiber membrane module 100 into the internal space 40s of the housing 40. The concentrated raw liquid is discharged through the outlet 40a to the outside of the housing 40.

The cap 50 may be formed of the same material as that of the cap 30. The nut 62 may be formed of the same material as that of the nut 60. The other end portion of the housing 40 may be nozzle-shaped instead of the cap 50 and the nut 62 being disposed.

The fastening member is not limited to one that includes a nut and a screw portion. For example, the fastening member may include a bolt and a nut.

The sealing portion 22 is formed of, for example, the same resin as that of the binding portion 20. Instead of the sealing portion 22, the binding portion 20 may be provided at the other end portions of the hollow fiber membranes 10. That is, the hollow fiber membranes 10 may be opened at both end portions thereof. The hollow fiber membrane module 100 may be an internal-pressure-type hollow fiber membrane module.

The structure of the hollow fiber membrane module 100 will be described in more detail.

As shown in FIG. 2, in the hollow fiber membrane module 100 of the present embodiment, no other component is present between the binding portion 20 and the cap 30. The other component is typically a seal ring. There is no groove for fitting the seal ring between the binding portion 20 and the cap 30. That is, there is no groove for fitting the seal ring on both the surface of the binding portion 20 that faces the cap 30 and the surface of the cap 30 that faces the binding portion 20. In such a structure, liquid accumulation is unlikely to occur or does not occur between the binding portion 20 and the cap 30. In other words, liquid such as permeate liquid is unlikely to be accumulated or is not accumulated between the binding portion 20 and the cap 30. A contamination such as particulates is unlikely to be accumulated or is not accumulated between the binding portion 20 and the cap 30. Therefore, the hollow fiber membrane module 100 can be easily cleaned by using cleaning liquid without disassembling the module 100.

The above-described effect is particularly significant when the hollow fiber membrane module 100 is an external-pressure-type hollow fiber membrane module. When the hollow fiber membrane module 100 is an external-pressure-type hollow fiber membrane module, permeate liquid passes through the inside of the hollow fiber membranes 10 and the internal space 30s of the cap 30, is discharged from the hollow fiber membrane module 100, and is supplied to a point of use. When no liquid accumulation occurs between the binding portion 20 and the cap 30, the contamination is not accumulated in the liquid accumulation and the contamination does not affect the degree of cleaning for the permeate liquid. Furthermore, the hollow fiber membrane module 100 can be easily cleaned.

In the present embodiment, the unit 70 can be detached from the housing 40 and the unit 70 can be attached to the housing 40 while integration of the binding portion 20 and the cap 30 is maintained. The unit 70 is detached from the housing 40, and the hollow fiber membranes 10 and/or the binding portion 20 are cleaned or repaired, and, thereafter, the unit 70 can be attached to the housing 40. Alternatively, a new unit 70 may be attached to the housing 40. That is, the hollow fiber membrane module 100 of the present embodiment can allow the hollow fiber membranes 10 and/or the binding portion 20 to be quickly and easily cleaned, changed, or repaired. The hollow fiber membranes 10 can be detached from the housing 40 without breaking each component, thereby reducing cost for the components.

As shown in FIG. 2 and FIG. 3, the cap 30 is joined to the outer circumferential portion of the binding portion 20. The hollow fiber membranes 10 are not provided on the outer circumferential portion of the binding portion 20. Therefore, even when the cap 30 is joined to the outer circumferential portion of the binding portion 20, the hollow fiber membranes 10 are not affected.

In the present embodiment, the cap 30 has a sleeve 32. The sleeve 32 extends along the longitudinal direction of the hollow fiber membrane 10 and surrounds the binding portion 20 in the circumferential direction. Specifically, the sleeve 32 surrounds the binding portion 20 over 360 degrees. The sleeve 32 is joined to the binding portion 20. In such a structure, the surface at which the binding portion 20 and the cap 30 are joined can assuredly have a sufficient area. Therefore, the binding portion 20 and the cap 30 can be firmly fixed to each other.

In the present embodiment, an adhesive 36 is filled between the inner circumferential surface of the sleeve 32 and the outer circumferential surface of the binding portion 20. Use of the adhesive 36 allows the binding portion 20 and the cap 30 to be integrated while a gap between the binding portion 20 and the sleeve 32 is assuredly filled. A gap in which liquid is accumulated is unlikely to be formed between the binding portion 20 and the sleeve 32. The kind of the adhesive 36 is not particularly limited. Examples of the adhesive 36 include epoxy-based adhesives, silicone-based adhesives, and acrylic adhesives. Instead of the adhesive 36 being used, the cap 30 may be welded to the binding portion 20.

The cap 30 further includes a conical cap body 34. In the present embodiment, the cap 30 has the sleeve 32, the end portion 33, and the cap body 34. The sleeve 32 has a tubular shape, and is provided on the wider-opening side of the cap body 34. The end portion 33 is nozzle-shaped, and is provided on the narrower-opening side of the cap body 34.

FIG. 2 and FIG. 3 show a cross-section that includes the central axis O of the housing 40 and is parallel to the longitudinal direction of the hollow fiber membrane 10. On the cross-section, the sleeve 32 is wedge-shaped. In other words, the thickness of the sleeve 32 is gradually reduced toward the end thereof. In such a structure, a gap in which liquid is accumulated is unlikely to be formed between the binding portion 20 and the sleeve 32. Furthermore, filling of the adhesive 36 between the binding portion 20 and the sleeve 32 can be facilitated. The thickness of the sleeve 32 represents the dimension of the sleeve 32 in the direction perpendicular to the central axis O.

Figure 4:
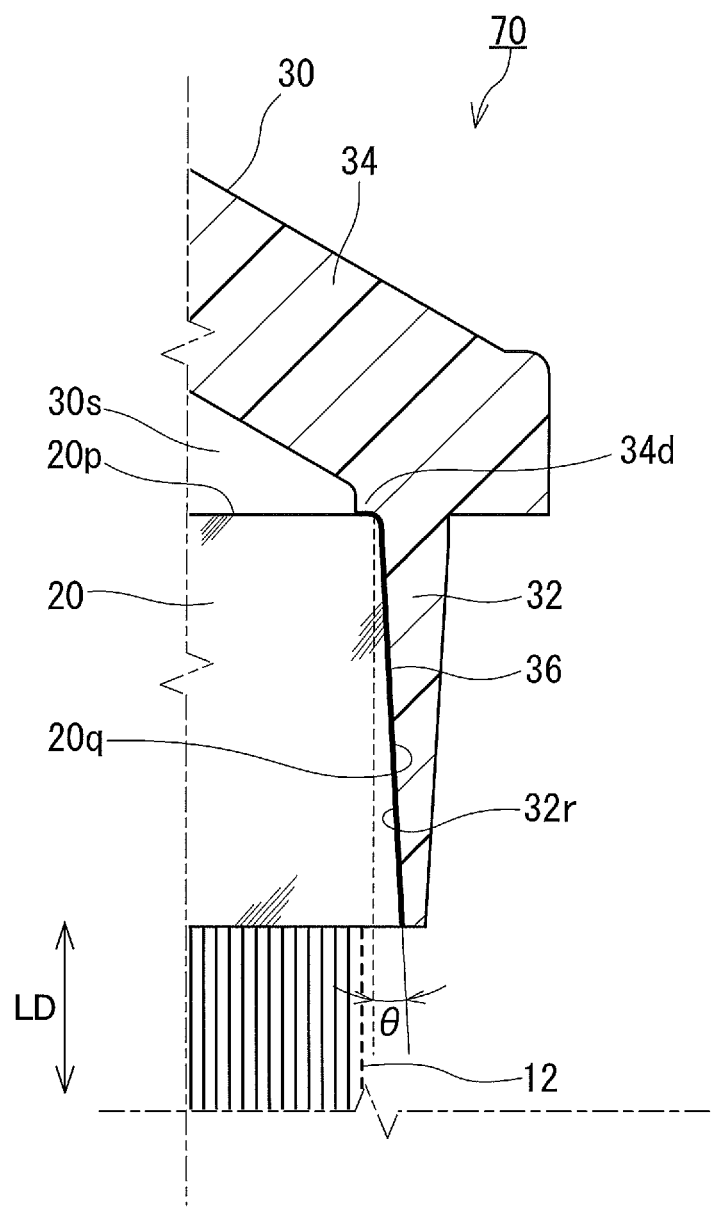
FIG. 4 is a partially enlarged cross-sectional view of a unit that includes hollow fiber membranes, a binding portion, and a cap.

FIG. 4 is a partially enlarged cross-sectional view of the unit 70 that includes the hollow fiber membranes 10, the binding portion 20, and the cap 30. In the present embodiment, the binding portion 20 has a truncated-cone shape. That is, the binding portion 20 and the sleeve 32 are shaped so as to fit into each other. In the binding portion 20, the end surface 20p that faces the internal space 30s of the cap 30 is the upper surface (having a smaller diameter) of the truncated cone. An outer circumferential surface 20q (side surface) of the binding portion 20 is tilted relative to a longitudinal direction LD of the housing 40. A tilt angle $\theta$ of the outer circumferential surface 20q relative to the longitudinal direction LD is, for example, greater than 0 degrees, and less than or equal to 45 degrees. An inner circumferential surface 32r of the sleeve 32 has the same tilt angle $\theta$. The adhesive 36 is smoothly filled between the binding portion 20 and the sleeve 32, so that a gap is unlikely to be formed between the binding portion 20 and the sleeve 32. That is, a contamination such as particulates is unlikely to be accumulated between the binding portion 20 and the sleeve 32. The binding portion 20 may have a columnar shape. In this case, the outer circumferential surface 20q of the binding portion 20 and the inner circumferential surface 32r of the sleeve 32 are parallel to the longitudinal direction LD.

As long as liquid accumulation between the binding portion 20 and the cap 30 can be avoided, the length of the sleeve 32 in the longitudinal direction of the hollow fiber membrane 10 is not particularly limited. In the present embodiment, the end of the sleeve 32 reaches the lower end of the binding portion 20.

The cap 30 further includes a shoulder portion 34d located inward of the sleeve 32. In the present embodiment, the shoulder portion 34d is a part of the cap body 34. The shoulder portion 34d overlaps the binding portion 20 in the radial direction of the hollow fiber membrane module 100, and the shoulder portion 34d is further joined to the binding portion 20. The adhesive 36 can be present not only between the binding portion 20 and the sleeve 32 but also between the binding portion 20 and the shoulder portion 34d. In such a structure, the cap 30 can be assuredly fixed to the binding portion 20, and the internal space 30s of the cap 30 can be assuredly isolated from the internal space 40s of the housing 40. Liquid accumulation can be prevented from occurring between the binding portion 20 and the cap 30.

A part of the end surface 20p of the binding portion 20 is in contact with the shoulder portion 34d through the adhesive. Thus, the hollow fiber membranes 10 and the binding portion 20 are prevented from moving so as to approach the end portion 33 of the cap 30. The shoulder portion 34d acts as a stopper for preventing the binding portion 20 from moving relative to the cap 30. When the hollow fiber membrane module 100 is used, a strong impact may be imparted to the binding portion 20 due to water flow. Repeated strong impacts may cause shear fracture between the binding portion 20 and the cap 30, so that a crack may occur between the outer circumferential surface 20q of the binding portion 20 and the inner circumferential surface 32r of the sleeve 32. However, in the structure according to the present embodiment, the shoulder portion 34d receives the impact caused by water flow, and, therefore, even if repeated strong impacts are imparted to the binding portion 20, the above-described defect is unlikely to occur. Furthermore, even if the defect occurs, the unit 70 can be quickly changed or repaired.

On the cross-section shown in FIG. 4, the sleeve 32 and the shoulder portion 34d form an obtuse corner, and the binding portion 20 fits into the corner. Thus, the hollow fiber membranes 10 and the binding portion 20 are prevented from moving so as to approach the end portion 33 of the cap 30, and the hollow fiber membranes 10 and the binding portion 20 are prevented from moving in the direction perpendicular to the longitudinal direction LD.

As shown in FIG. 3, the hollow fiber membrane module 100 further includes a seal ring 64. The seal ring 64 is disposed between the housing 40 and the cap 30, and seals a gap between the housing 40 and the cap 30. In the present embodiment, a groove 40c is provided in the opening end surface of the housing 40, and the seal ring 64 fits into the groove 40c. The groove 40c is positioned so as to be covered by a surface 34p of the cap 30, specifically, by the surface 34p of the cap body 34. In such a structure, the cap 30 can be assuredly fixed to the housing 40, and, therefore, the hollow fiber membrane module 100 can have excellent pressure resistance. The "opening end surface of the housing 40" represents the end surface of the housing 40 in the direction parallel to the central axis O.

The seal ring 64 is formed of, for example, a resin material having rubber elasticity. The seal ring 64 may be quadrangular packing or an O-ring.

The sleeve 32 is located between the binding portion 20 and the housing 40 in the radial direction of the hollow fiber membrane module 100. The sleeve 32 and the binding portion 20 are joined to each other. Meanwhile, the sleeve 32 and the housing 40 are not joined to each other. The seal ring 64 is disposed outward of the sleeve 32 in the radial direction. In such a structure, the cap 30 can be assuredly fixed to the housing 40, and, therefore, the hollow fiber membrane module 100 can have excellent pressure resistance.

The inner diameter of the housing 40 gently increases in a range in which the binding portion 20 and the sleeve 32 are located. That is, the inner diameter of the housing 40 at the opening end is larger than the inner diameter of the housing 40 in a range in which the hollow fiber membranes 10 are located. The binding portion 20 is not in contact with the inner circumferential surface of the housing 40. In such a structure, the unit 70 can be easily detached from the housing 40, and the unit 70 can be easily attached to the housing 40, so that workability for cleaning, changing, and repairing the unit 70 is improved.

The nut 60 has a shoulder portion 60k that is in contact with the upper surface of the cap 30, and fixes the cap 30 and the housing 40 to each other while deforming the seal ring 64. When the cap 30 is screwed onto the screw portion 40m provided on the outer circumferential surface of the housing 40, a force in the direction in which the cap 30 approaches the housing 40 is applied from the shoulder portion 60k of the nut 60 to the cap 30. Thus, the cap 30 can be assuredly fixed to the housing 40, and pressure resistance of the hollow fiber membrane module 100 can be sufficiently assured.

According to the present embodiment, the seal ring 64 and the groove 40c are present between the cap 30 and the housing 40. However, neither seal rings nor grooves are present at a position, between the binding portion 20 and the cap 30, which is able to be reached by the permeate liquid. Therefore, liquid accumulation is unlikely to occur in the flow path of permeate liquid, and, furthermore, the flow path of the permeate liquid is easily cleaned by using the cleaning liquid or the like.

When the hollow fiber membrane module 100 of the present embodiment is an external-pressure-type hollow fiber membrane module, a space around the plurality of hollow fiber membranes 10, that is, the internal space 40s of the housing 40 is used as the flow path of raw liquid. The internal space 30s of the cap 30 is used as the flow path of permeate liquid. The structure of the present embodiment is effective particularly for an external-pressure-type hollow fiber membrane module. This is because various processes using permeate liquid are unlikely to be negatively affected even when liquid accumulation occurs in the flow path of raw liquid to accumulate contaminations.

As shown in FIGS. 2 and 3, the hollow fiber membrane module 100 further includes a net 12. The net 12 can be one component of the unit 70. The plurality of hollow fiber membranes 10 are bound by the net 12. The net 12 enhances stiffness of the bundle of the plurality of hollow fiber membranes 10. In this case, the hollow fiber membranes 10 are unlikely to oscillate in the housing 40 due to water flow, and the hollow fiber membranes 10 are unlikely to be damaged. In particular, the hollow fiber membranes 10 can be prevented from being damaged near a boundary between the hollow fiber membranes 10 and the binding portion 20. When the unit 70 is attached to the housing 40, and when the unit 70 is detached from the housing 40, the net 12 inhibits oscillation of the hollow fiber membranes 10. Thus, damage to the hollow fiber membranes 10 can be prevented. The net 12 may include an inner-layer net and an outer-layer net. Such a double net structure is one of means for allowing water or cleaning liquid to flow at a high flow rate. The net 12 may be fixed to the bundle of the hollow fiber membranes 10 by a resin material such as an adhesive. In this case, the above-described effects can be more sufficiently exerted.

The sleeve 32 fits to the housing 40 by sliding. At least a part of the outer circumferential surface of the sleeve 32 is in contact with the inner circumferential surface of the housing 40. No substantial gap is present between the sleeve 32 and the housing 40 (more specifically, between the outer circumferential surface of the sleeve 32 and the inner circumferential surface of the housing 40). Therefore, the unit 70 can be assuredly fixed to the housing 40. Such a structure also inhibits the hollow fiber membranes 10 from oscillating in the direction perpendicular to the longitudinal direction LD, and contributes to prevention of damage to the hollow fiber membranes 10. The "no substantial gap" means that a gap is not designed to be intentionally provided between the sleeve 32 and the housing 40 except for a small gap for allowing the unit 70 to be attached to the housing 40 and allowing the unit 70 to be detached from the housing 40.

Figure 5:
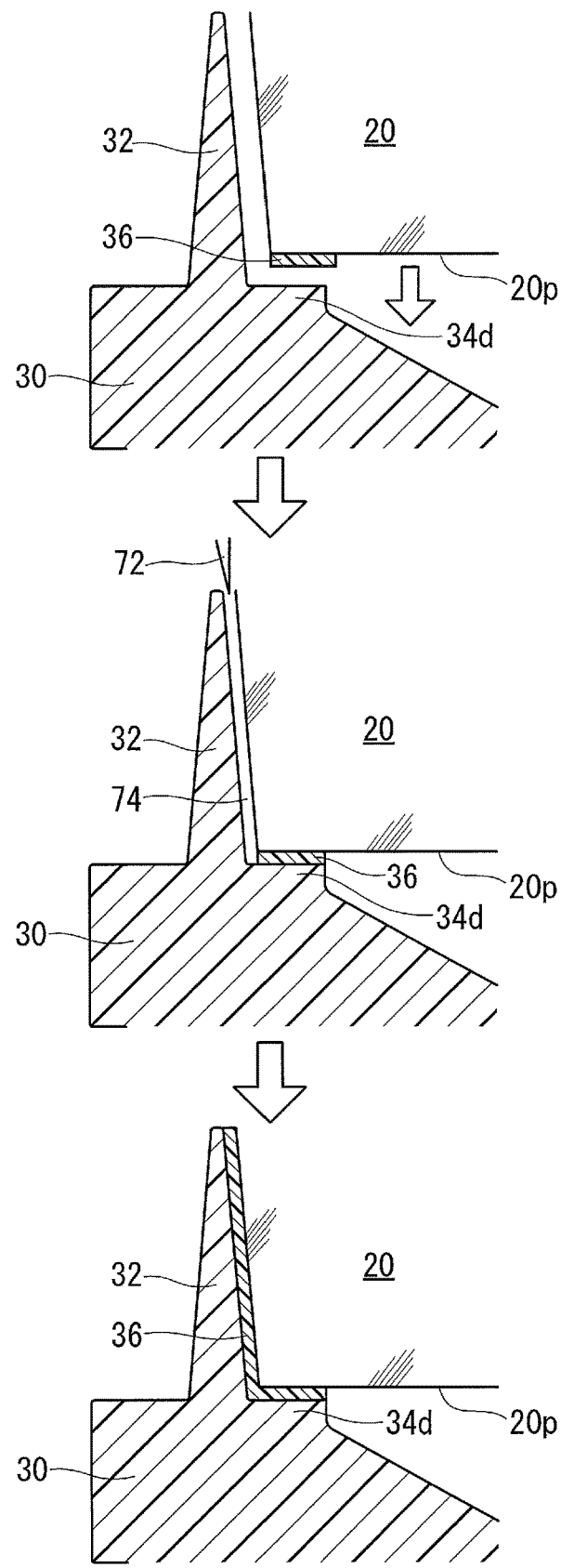
FIG. 5 illustrates a method for joining the binding portion and the cap.

FIG. 5 illustrates a method for joining the binding portion 20 and the cap 30 to each other. As shown in the upper portion in FIG. 5, the adhesive 36 is firstly applied to the end surface 20p of the binding portion 20, and the binding portion 20 and the cap 30 are brought into contact with each other. Next, as shown in the mid-portion in FIG. 5, the adhesive 36 is injected, by using an injector 72, into a gap 74 between the outer circumferential surface of the binding portion 20 and the sleeve 32 of the cap 30. As shown in the lower portion in FIG. 5, the adhesive 36 is hardened to obtain a unit including the hollow fiber membranes 10, the binding portion 20, and the cap 30. By using the unit, the hollow fiber membrane module 100 can be assembled.

INDUSTRIAL APPLICABILITY

The hollow fiber membrane module of the present invention can be used in various fields, e.g., for the manufacturing industry, the energy industry, the environmental industry, and the medical field.

The invention claimed is:
1. A hollow fiber membrane module comprising:
a plurality of hollow fiber membranes;
a binding portion binding the plurality of hollow fiber membranes at first end portions thereof;
a sealing portion sealing the plurality of hollow fiber membranes at second end portions thereof;
a first cap having an internal space that communicates with each of the plurality of hollow fiber membranes, the first cap being integrated with the binding portion;
a housing that houses the plurality of hollow fiber membranes and the binding portion, and that has a first end portion to which the first cap is attached; and
a second cap removably attached to a second end of the housing, wherein
the hollow fiber membrane module is an external-pressure-type hollow fiber membrane module in which a space around the plurality of hollow fiber membranes is used as a flow path of raw liquid, and the internal space of the first cap is used as a flow path of permeate liquid,
the sealing portion is joined to neither the housing nor the second cap,
a unit including the plurality of hollow fiber membranes, the binding portion, the first cap, and the sealing portion is detachable from the housing while integration of the binding portion and the first cap is maintained, and the unit is attachable to the housing while integration of the binding portion and the first cap is maintained.
2. The hollow fiber membrane module according to claim 1, wherein no seal ring is present between the binding portion and the first cap.
3. The hollow fiber membrane module according to claim 2, wherein
there is no groove for receiving the seal ring between the binding portion and the first cap.
4. The hollow fiber membrane module according to claim 1, wherein
the first cap comprises a sleeve that extends along a longitudinal direction of the hollow fiber membranes, and that surrounds the binding portion in a circumferential direction, and
the sleeve is joined to the binding portion.
5. The hollow fiber membrane module according to claim 4, wherein an adhesive is filled between an inner circumferential surface of the sleeve and an outer circumferential surface of the binding portion.
6. The hollow fiber membrane module according to claim 4, wherein
the first cap further comprises a shoulder portion located inward of the sleeve,
the shoulder portion overlaps the binding portion in a radial direction of the hollow fiber membrane module, and
the shoulder portion is further joined to the binding portion.

7. The hollow fiber membrane module according to claim 4, wherein the sleeve is wedge-shaped on a cross-section parallel to the longitudinal direction of the hollow fiber membranes.
8. The hollow fiber membrane module according to claim 1, wherein the binding portion has a truncated-cone shape.
9. The hollow fiber membrane module according to claim 1, further comprising:
a seal ring that is disposed between the housing and the first cap, and that seals a gap between the housing and the first cap.
10. The hollow fiber membrane module according to claim 1, further comprising a fastening member that fixes the first cap and the housing to each other, wherein
the unit is detachable from the housing by unfixing the first cap and the housing fixed by the fastening member.
11. The hollow fiber membrane module according to claim 10, wherein
the fastening member comprises a nut that fixes the first cap and the housing to each other, and
the nut comprises a shoulder portion that is in contact with an upper surface of the first cap.
12. A hollow fiber membrane module comprising:
a plurality of hollow fiber membranes;
a binding portion binding the plurality of hollow fiber membranes at first end portions thereof, the binding portion having a truncated-cone shape;
a sealing portion sealing the plurality of hollow fiber membranes at second end portions thereof;
a first cap having an internal space that communicates with each of the plurality of hollow fiber membranes, the first cap being integrated with the binding portion;
a housing that houses the plurality of hollow fiber membranes and the binding portion, and that has a first end portion to which the first cap is attached;
a fastening member that fixes the first cap and the housing to each other; and
a second cap removably attached to a second end of the housing, wherein
the hollow fiber membrane module is an external-pressure-type hollow fiber membrane module in which a space around the plurality of hollow fiber membranes is used as a flow path of raw liquid, and the internal space of the first cap is used as a flow path of permeate liquid,
the sealing portion is joined to neither the housing nor the second cap,
the first cap comprises a sleeve and a shoulder portion located inward of the sleeve,
the sleeve extends along a longitudinal direction of the hollow fiber membranes, surrounds the binding portion in a circumferential direction, and is joined to the binding portion by an adhesive filled between an inner circumferential surface of the sleeve and an outer circumferential surface of the binding portion,
the internal space of the first cap, which is the flow path of raw liquid, is isolated from the internal space of the housing, which is the flow path of permeate liquid, by the adhesive,
the shoulder portion overlaps the binding portion in a radial direction of the hollow fiber membrane module,
the adhesive is also present between the binding portion and the shoulder portion so that the shoulder portion is further joined to the binding portion, and
a unit including the plurality of hollow fiber membranes, the binding portion, the first cap and the sealing portion is detachable from the housing while integration of the binding portion and the first cap is maintained by unfixing the first cap and the housing fixed by the fastening member, and the unit is attachable to the housing while integration of the binding portion and the first cap is maintained.

\* \* \* \* \*